(12) United States Patent
Li et al.

(10) Patent No.: US 10,401,618 B2
(45) Date of Patent: Sep. 3, 2019

(54) ULTRASONIC LENS CLEANING SYSTEM WITH CURRENT SENSING

(71) Applicant: Texas Instruments Incorporated, Dallas, TX (US)

(72) Inventors: Yunhong Li, Santa Clara, CA (US); Nabeel Fuad Khan, Sunnyvale, CA (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 362 days.

(21) Appl. No.: 15/059,529

(22) Filed: Mar. 3, 2016

(65) Prior Publication Data

US 2016/0266379 A1    Sep. 15, 2016

Related U.S. Application Data

(60) Provisional application No. 62/131,359, filed on Mar. 11, 2015.

(51) Int. Cl.

| G02B 27/00 | (2006.01) |
| B08B 7/02 | (2006.01) |
| B60S 1/56 | (2006.01) |
| H04N 5/217 | (2011.01) |

(52) U.S. Cl.
CPC .......... *G02B 27/0006* (2013.01); *B08B 7/028* (2013.01); *B60S 1/56* (2013.01); *H04N 5/2171* (2013.01)

(58) Field of Classification Search
CPC ......... B08B 7/028; B60S 1/56; H04N 5/2171; G02B 27/0006
USPC ................................................ 310/322, 334
See application file for complete search history.

(56) References Cited

U.S. PATENT DOCUMENTS

| 3,681,626 A | 8/1972 | Puskas |
| 4,271,371 A | 6/1981 | Furuichi et al. |
| 4,607,652 A | 8/1986 | Yung |
| 7,705,517 B1 | 4/2010 | Koen et al. |
| 8,293,026 B1 | 10/2012 | Bodor et al. |
| 2002/0036444 A1* | 3/2002 | Yamashiro ............ B06B 1/0253 310/316.01 |

* cited by examiner

*Primary Examiner* — Derek J Rosenau
(74) *Attorney, Agent, or Firm* — Michael A. Davis, Jr.; Charles A. Brill; Frank D. Cimino (57) ABSTRACT

Disclosed examples include ultrasonic cleaning systems, driver integrated circuits and methods for cleaning a lens, in which an oscillating drive signal is provided to an ultrasonic transducer and the driver controls the frequency of the drive signal according to a current sense signal representing a drive current flowing in the transducer. The driver sweeps the drive signal frequency and compares the sensed current values with predetermined profiles corresponding to a clean lens and a lens with one or more known contaminants, and generates the drive signal at one or more frequencies corresponding to peaks or valleys of the sensed current values or predetermined frequencies to promote cleaning of the lens.

16 Claims, 6 Drawing Sheets

ULTRASONIC LENS CLEANING SYSTEM WITH CURRENT SENSING

Under 35 U.S.C. § 119, this application claims priority to, and the benefit of, U.S. Provisional Patent Application Ser. No. 62/131,359 that was filed on Mar. 11, 2015 and is entitled ULTRASOUND LENS CLEANER DRIVER USING CURRENT SENSING CLOSE LOOP STRUCTURE, the entirety of which is incorporated by reference herein.

TECHNICAL FIELD

The present disclosure relates generally to lens cleaning systems and more particularly to ultrasonic cleaning systems with current sensing.

BACKGROUND

Lenses are used for a variety of optical systems, such as camera lenses, light source lenses, etc. In outdoor applications, particularly vehicle-based systems, camera or light source lenses are subject to ambient weather conditions, dirt and debris, and other contaminants which can obstruct or interfere with optical transmission through the lens. It is desirable to provide a substantially clean or clear optical path through the lens for camera-based systems to facilitate proper imaging, and for light source systems to facilitate the expected area illumination. Outdoor surveillance cameras and lighting systems, as well as vehicle-based lighting and camera systems are often inconveniently located for manual cleaning and automated lens cleaning systems are therefore desirable. Moreover, many lighting and camera systems have limited form factors and available power, and compact and energy-efficient automated lens cleaning solutions would be beneficial.

SUMMARY

Disclosed examples include ultrasonic cleaning systems, integrated circuits and methods for cleaning a lens. In certain examples, a driver provides an oscillating drive signal to an ultrasonic transducer mechanically coupled with a lens, and the driver controls the drive signal frequency according to a current sense signal representing a drive current flowing in the transducer. The driver in certain examples sweeps the drive signal frequency and compares the sensed current values with predetermined profiles corresponding to a clean lens and/or a lens with one or more known contaminants, and generates the drive signal at one or more frequencies corresponding to peaks or valleys of the sensed current values or at predetermined frequencies of a matching profile to promote cleaning of the lens.

DETAILED DESCRIPTION

In the drawings, like reference numerals refer to like elements throughout, and the various features are not necessarily drawn to scale. In the following discussion and in the claims, the terms "including", "includes", "having", "has", "with", or variants thereof are intended to be inclusive in a manner similar to the term "comprising", and thus should be interpreted to mean "including, but not limited to . . . " Also, the term "couple" or "couples" is intended to include indirect or direct electrical or mechanical connection or combinations thereof. For example, if a first device couples to or is coupled with a second device, that connection may be through a direct electrical connection, or through an indirect electrical connection via one or more intervening devices and connections.

Figure 1:
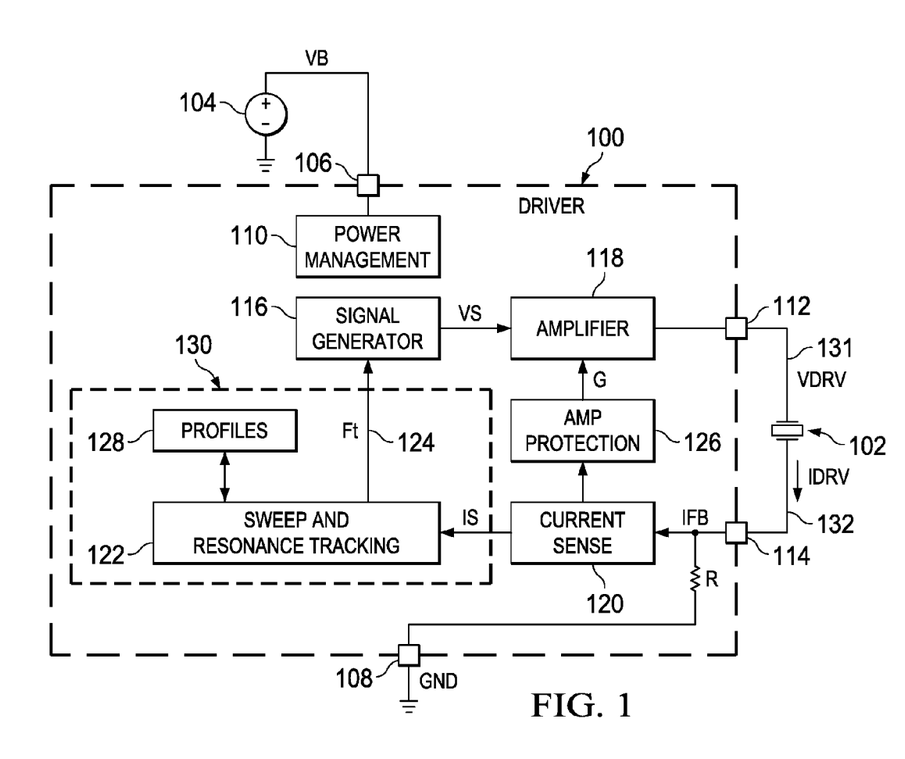
FIG. 1 is a schematic diagram of an ultrasonic lens cleaning system.
Figure 2:
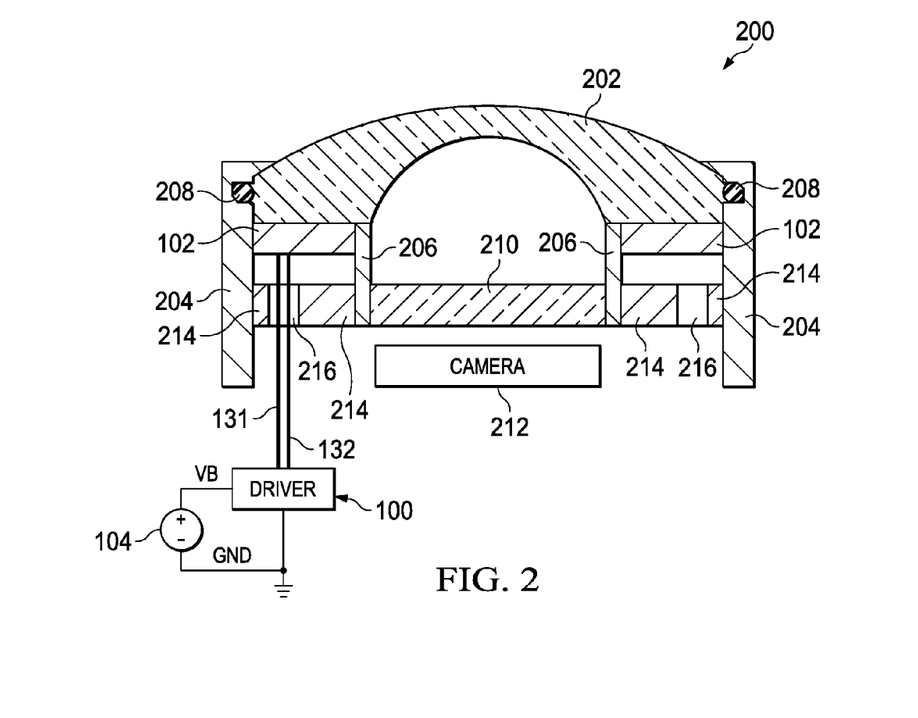
FIG. 2 is a partial sectional side elevation view of a camera lens assembly including an ultrasonic lens cleaning system.

Referring initially to FIGS. 1 and 2, FIG. 1 shows an ultrasonic lens cleaning system with a driver integrated circuit (IC) 100 and FIG. 2 shows a camera lens assembly 200 including an ultrasonic lens cleaning system. As seen in FIG. 2, the lens assembly 200 includes a cylindrical or "ring" transducer 102 which is mechanically coupled to vibrate a lens 202. The lens 202 in one example is a "fisheye" lens having a curved as shown in FIG. 2. In other examples, a flat lens or a lens having a different profile can be used. In this example, the lens 202 is mounted into a cylindrical housing 204 with a cylindrical inner spacer structure 206, and a ring-shaped piezoelectric transducer 102 is disposed between the spacer 206 and the outer wall of the housing 204. The lens assembly is sealed using an O-ring 208 extending between a peripheral edge of the lens 202 and the outer wall of the housing 204 to prevent ingress of water or debris into the interior of the housing 204. In one example, the housing 204 can be mounted to a motor vehicle to operate as a rear backup camera, or as a forward or side-facing camera. In other examples, the assembly 200 can be mounted to a building or a light pole, for example, for security camera applications. In other examples, the assembly 200 can be used for interior security monitoring systems, such as within a commercial or residential building. In this example, a generally flat second lens 210 is disposed within the inner surfaces of the spacer 206. The second lens 210 and the fisheye lens 202 provide an optical path for imaging by a camera 212. The transducer 102 includes lead wires 131 and 132 that extend through an opening 216 in a base 214 of the housing 204 for connection with the driver IC 100.

In use, particularly in outdoor installations, the upper surface of the lens 202 is subjected to accumulation of dirt, debris, water and other optical obstructions, referred to herein as contaminants. The driver 100 receives input power from a power supply or power source 104, such as a battery providing a battery voltage signal VB with respect to a reference node, such as a ground node GND in one example. The driver 100 provides an oscillating signal to cause the transducer 102 to vibrate the lens 202 to facilitate or promote cleaning of the lens 202. In one example, the driver 100 provides an ultrasonic drive signal or voltage waveform VDRV to actuate the transducer 102 and cause the transducer 102 to mechanically vibrate the lens 202 using ultrasonic waves to remove dirt and/or water from the surface of the lens 202. Mechanical oscillation or motion of the lens 202 at ultrasonic waves of a frequency at or close to the system resonant frequencies can facilitate energy efficient removal of water, dirt and/or debris from the lens 202. However, the amount of dirt/water on the lens 202, as well as system boundaries and other environmental factors, vary over time and the system resonant frequencies change accordingly. Consequently, simply operating the transducer 102 at a fixed frequency may result in degraded cleaning performance without adapting to the new resonant frequencies. The driver IC 100 in one example provides a circuit structure that automatically tracks changes in the resonant mechanical frequency of an associated lens system, and provides a closed loop system to use this information to maintain cleaning performance over time and in varying environmental conditions.

Figure 3:
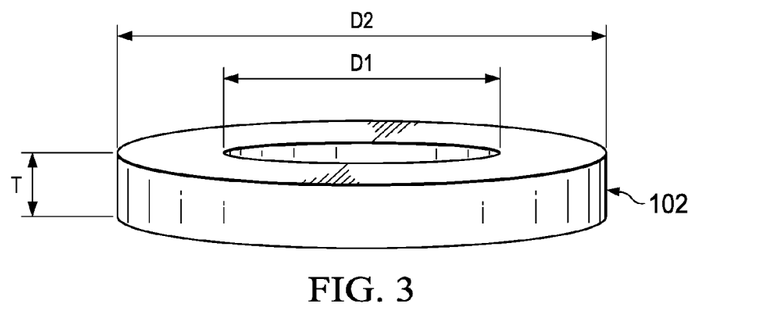
FIG. 3 is a perspective view of a cylindrical ring transducer in the camera lens assembly of FIG. 2.
Figure 4:
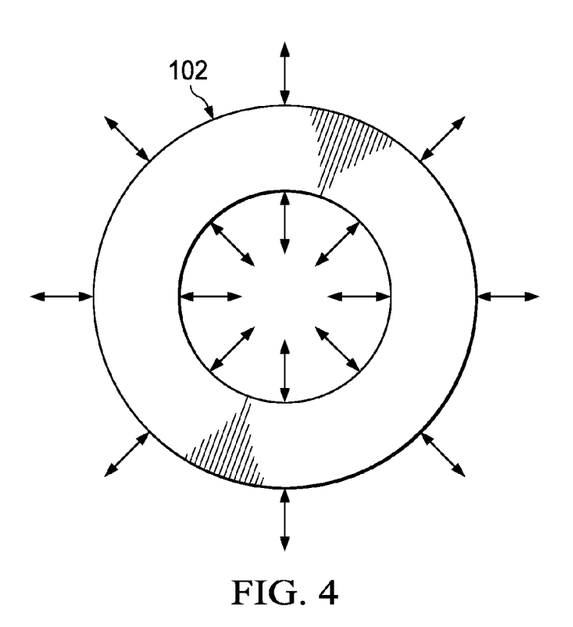
FIG. 4 is a top plan view of a radial resonant mode of the transducer of FIG. 3.
Figure 5:
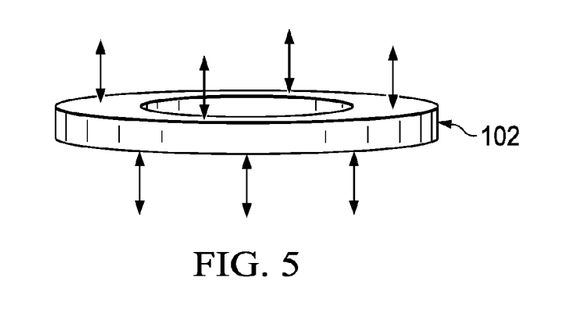
FIG. 5 is a perspective view of thickness resonant mode of the transducer of FIG. 3.

Referring also to FIGS. 3-5, the driver system in illustrated examples provides an advance over self-oscillating circuits or other feedback approaches which establish oscillation by several external components and typically suffer from limited operational range. In addition, the ring transducer 102 has various useful resonant modes which self-oscillator circuits cannot utilize over the entire useful range, including three resonant modes shown in FIGS. 3-5.

FIG. 3 illustrates the transducer 102 having an inner diameter D1, an outer diameter D2 and a thickness T. A first resonant mode is a wall thickness mode, in which a wall thickness resonance frequency $f_w$ is given according to the following equation:

$$f_w = \frac{1}{(D2-D1)\sqrt{\rho s_{11}^E}},$$

where $\rho$ is density and $s^E_{11}$ is the elastic compliance at a constant electric field.

FIG. 4 illustrates a second radial resonant mode of the transducer 102 in which the corresponding radial resonant frequency $f_r$ is given according to the following equation:

$$f_r = \frac{2}{\pi(D1+D2)\sqrt{\rho s_{11}^E}}.$$

FIG. 5 shows a thickness resonant mode of the transducer 102 in which the corresponding thickness resonant frequency $f_t$ is given according to the following equation:

$$f_t = \frac{1}{2T\sqrt{\rho s_{33}^D}},$$

where $\rho$ is the density and $s^D_{33}$ is the elastic compliance at a constant charge density.

To maximize the vibration of the lens 202, particularly for varying environmental conditions found in vehicle-based and other outdoor applications, the driver 100 advantageously actuates the transducer 102 at a selected resonant frequency, or combinations of several resonant frequencies, either concurrently or sequentially in order to facilitate or promote cleaning of the lens 202. In this regard, simply driving the transducer 102 in an open loop manner will generally not achieve the best efficiency in terms of cleaning results and power consumption, since the resonance of the lens system 200 changes based on the amount and types of contaminants on the lens 202.

Returning to FIG. 1, the illustrated driver IC 100 uses closed loop feedback based on sensed drive current IDRV flowing in the transducer 102 in order to enhance the cleaning capabilities of the system. In certain examples, the driver 100 tracks the resonant frequency changes by monitoring the drive current IDRV and maintaining the driving signal VDRV at optimum frequencies based on one or more operating criterion. In one example, the driver IC 100 regulates operation at or near a local minima or maxima in a current or impedance signal value ascertained from current feedback representing the drive current IDRV flowing in the transducer 102. The current feedback provides information regarding real time transducer impedance values, from which the optimum driving signal frequency can be determined. Unlike self-oscillating drive circuitry, the driver 100 implements a closed-loop approach that allows the frequency range to be broadened to cover the entire useful frequency range of the transducer 102, and the useful frequency range is not restricted by external components. In addition, the driver 100 in certain examples selects the oscillation frequency or frequencies to facilitate system efficiency with respect to cleaning results and/or power consumption/power delivery.

Figure 6:
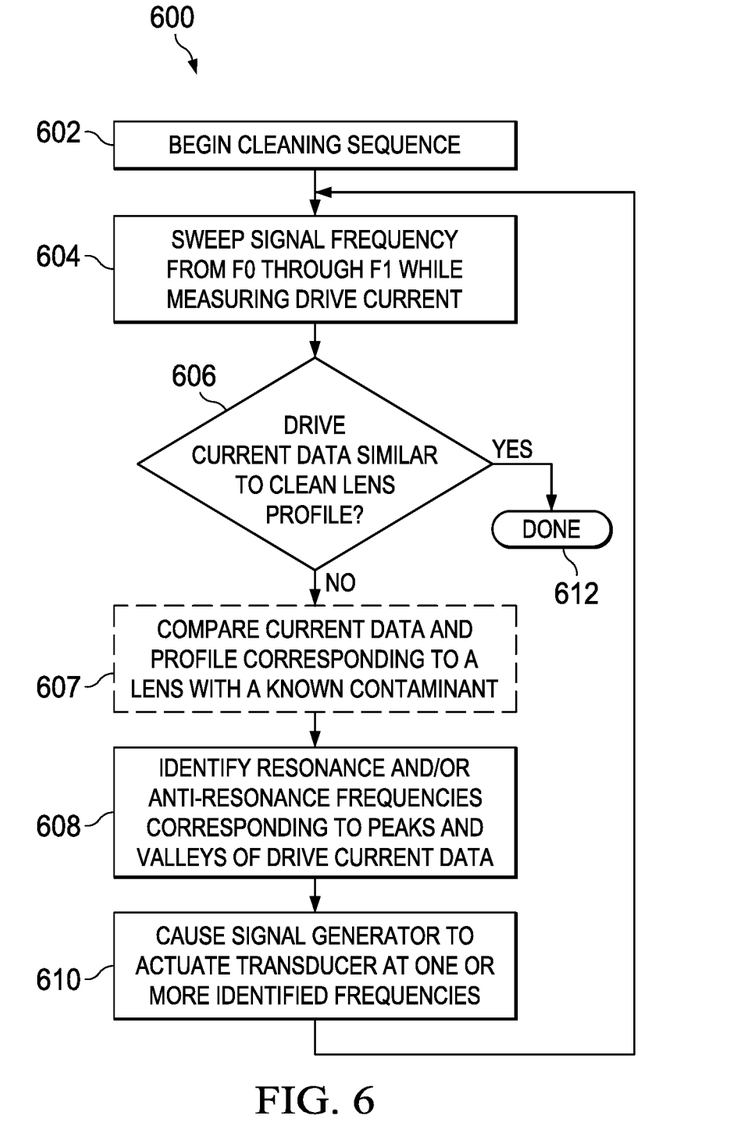
FIG. 6 is a flow diagram of a method of ultrasonic cleaning.

Disclosed examples include ultrasonic cleaning systems, driver integrated circuits 100 and methods 600 for cleaning a lens 202, in which an oscillating drive signal VDRV is provided to an ultrasonic transducer 102 and the driver 100 controls the frequency of the drive signal VDRV according to a current sense signal IS representing a drive current IDRV flowing in the transducer 102. The example driver IC 100 includes a terminal 106 to receive the battery voltage signal VB from the power supply 104, as well as a ground terminal 108 for connection to GND. The driver IC 100 includes a power management circuit 110 that receives the battery voltage signal VB and provides one or more supply voltages (not shown) to power the internal circuitry of the driver 100. In addition, the IC 100 includes terminals 112 and 114 for connection to the lead wires 131 and 132, respectively, of the transducer 102. The IC 100 includes a signal generator 116 which generates a first output signal VS that oscillates at a non-zero frequency determined by a frequency control or command signal or value Ft. In some examples, the frequency Ft is ultrasonic, such as about 20 kHz or more, although not a strict requirement of all implementations of the presently disclosed examples.

In certain examples, the signal generator 116 is an analog circuit capable of providing an oscillating output signal VS of any suitable waveform shape in a range of frequencies from 1 kHz through 3 MHz, and can provide the signal VS that concurrently includes multiple frequency components in order to excite the driven transducer 102 at multiple frequencies concurrently. In one example, the signal generator circuit 116 is a switching circuit to provide a square wave output signal voltage waveform VS. In other examples, the signal generator 116 provides sinusoidal output voltage signals. In other examples, triangle, sawtooth, or other wave shapes or combinations thereof can be provided by the signal generator 116.

The driver IC 100 also includes an amplifier circuit 118 which amplifies the signal VS and delivers the drive signal VDRV to the transducer 102. Any suitable amplifier circuitry 118 can be used, for example, an op amp circuit designed to accommodate the frequency bandwidth of the signals VS provided by the signal generator 116 and the output signal requirements to properly drive a given transducer 102.

The driver IC 100 also includes a current sense circuit 120 which senses the drive current IDRV flowing in the transducer 102. In one example, the return current path of the transducer 102 is provided through the IC terminal 114 and a sense resistor R to the ground terminal 108. In this example, the resistor R provides a voltage signal IFB as an input to the current sense circuit 120 representing the drive current IDRV of the transducer 102. The current sense circuit 120 generates a current sense signal IS representing the drive current IDRV flowing in the transducer 102.

The driver IC 100 further includes a control circuit 130 which controls the frequency of the first output signal VS according to the current sense signal IS. In one example, the control circuit 130 includes one or more programmed or programmable logic circuits, such as a microprocessor, microcontroller, etc. In another example, the control circuit 130 is an analog circuit. The control circuit 130 provides a tone or frequency command signal Ft representing the non-zero frequency or frequencies of the signal VS to be provided by the signal generator circuit 116. In one example, the control circuit 130 provides an analog signal Ft via a signal line 124 to the signal generator. In another example, the control circuit 130 provides a digital value or Boolean signal or signals to the signal generator 116 indicating one or more frequencies at which the signal generator is to operate in providing the first output signal VS.

In the example of FIG. 1, the control circuit 130 includes a sweep and resonance tracking circuit 122. The sense circuit 120 provides the current sense signal IS as an input to the circuit 122 for use as a feedback signal in real time regulation of the signal generator output signal VS. In one example, the control circuit 130 computes or determines a transducer impedance value based on the sensed current signal IS, and uses the transducer impedance information to selectively adjust the frequency indicated by the command signal Ft. In other examples, the sweep and resonance tracking circuit 122 operates according to the current signal IS without computing or otherwise determining a corresponding impedance value. The driver IC 100 in certain examples also includes a protection circuit 126 which receives a signal from the current sense circuit 120 (e.g., the signal IS). The protection circuit 126 in one example selectively adjusts a gain G of the amplifier 118 according to the current sense signal IS to protect the amplifier 118. For example, the protection circuit 126 compares the signal IS to a threshold, and reduces the gain G of the amplifier 118 if the threshold is exceeded. In this manner, the circuit 126 mitigates or prevents damage to the amplifier 118 which otherwise operates in a closed loop.

The control circuit 130 in certain examples also includes a memory to store one or more profiles 128. The profiles in one example include a profile corresponding to current and/or impedance values as a function of frequency within a frequency range F0-F1 corresponding to a clean lens 202 (e.g., having no water, dirt, contaminants, etc.). The clean lens profile 128 in one example can be created and stored in the control circuit 130 during manufacturing of the driver IC 100. In another example, an optical system (e.g., camera 212 in FIG. 2) can signal the driver circuit 100 that the optical path of the lenses 210 and 202 is sufficiently clean, and cause the driver IC 100 to generate the transducer drive signal VDRV at a plurality of frequencies within the frequency range F0-F1 while obtaining and storing corresponding samples of the sensed current signal IS to establish a profile of current as a function of frequency corresponding to a clean lens 202. In addition, and certain examples, the control circuit 130 stores one or more contaminant profiles 128 corresponding to a lens 202 with a known contaminant or contaminants. For example, the control circuit 130 can store a profile 128 corresponding to a certain amount of water on the lens 202, as well as a second contaminant profile 128 corresponding to water and dirt on the lens 202. In a further example, a contaminant profile 128 can be stored in the control circuit 130 corresponding to dried dirt on the lens 202. As discussed further below, different impedance profiles, and corresponding current profiles can be established and stored in the control circuit 130 corresponding to a variety of different contaminants or combinations thereof.

In certain examples, the driver 100 sweeps the drive signal frequency by operation of the control circuit 130 providing corresponding frequency command signals Ft while obtaining sensed current feedback values of the signal IS. The sweep and resonance tracking circuit 122 in certain examples compares the sensed current values with a predetermined profile 128 corresponding to a clean lens 202 and/or with a profile or profiles corresponding to the lens 202 with one or more known contaminants. Based on this comparison, the driver IC 100 generates the drive signal VDRV at one or more frequencies corresponding to peaks or valleys of the sensed current values or at one or more predetermined frequencies correlated with identified contaminants on the lens 202 in order to promote lens cleaning.

FIG. 6 shows a method 600 of ultrasonic cleaning, which can be implemented by the driver IC 100 in certain examples. At 602, the cleaning sequence begins, and the control circuit 130 sweeps the signal frequency of the drive signal VDRV at 604 in a frequency range from a first frequency F0 through a final frequency F1 while measuring or sensing the drive current IDRV. In one example, the control circuit 130 provides the command signal Ft to the signal generator 116 in a generally continuous fashion at 604 in order to provide a continuous frequency sweep in the range F0-F1. In another example, the sweeping is done at 604 in a discrete fashion such that the driver IC 100 generates the drive signal VDRV at a plurality of discrete frequencies Ft in the frequency range F0-F1. At 604, the control circuit 130 in one example obtains and stores a plurality of current signal values of the drive current IDRV that individually correspond to the plurality of frequencies Ft. At 606, in one example, the control circuit 130 compares a first profile 128 corresponding to a clean lens 202 and a second profile corresponding to the plurality of current signal values and the corresponding plurality of frequencies Ft obtained during the sweep at 604.

If the first and second profiles are similar (YES at 606), the control circuit 130 concludes that no cleaning is required at the present time, and the cleaning sequence is done at 612. If, however, the first and second profiles are dissimilar (NO at 606), the control circuit 100 in one example compares a predetermined profile 128 corresponding to a lens 202 with a known contaminant to the second profile at 607. If the second profile is similar to the predetermined contaminant profile 128, the control circuit 130 in this example generates the drive signal VDRV at 610 at one or more predetermined frequencies to promote removal of the known contaminant from the lens 202.

Figure 9:
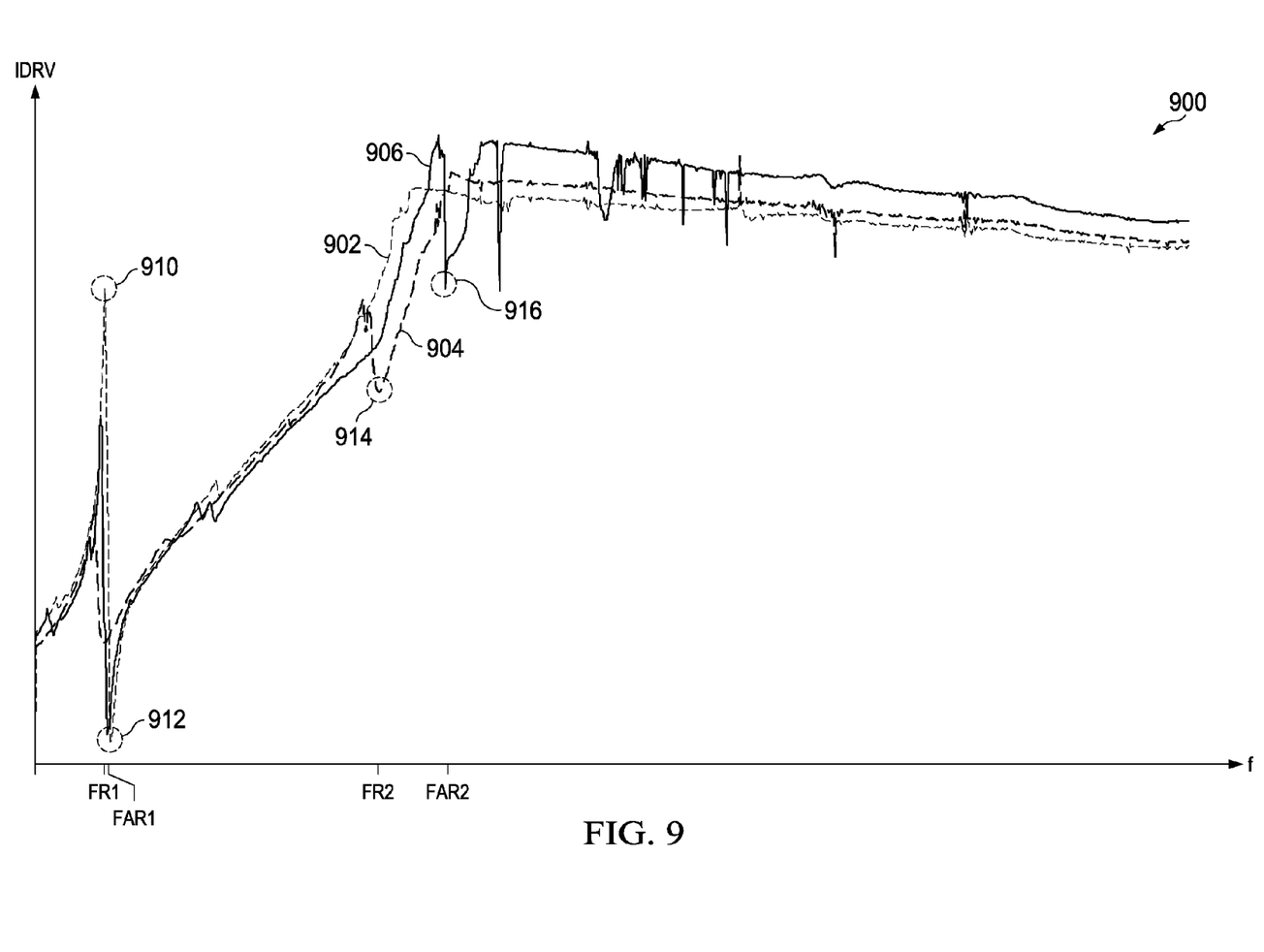
FIG. 9 is a graph of current as a function of frequency showing resonance shifting based on different lens contaminants.
Figure 10:
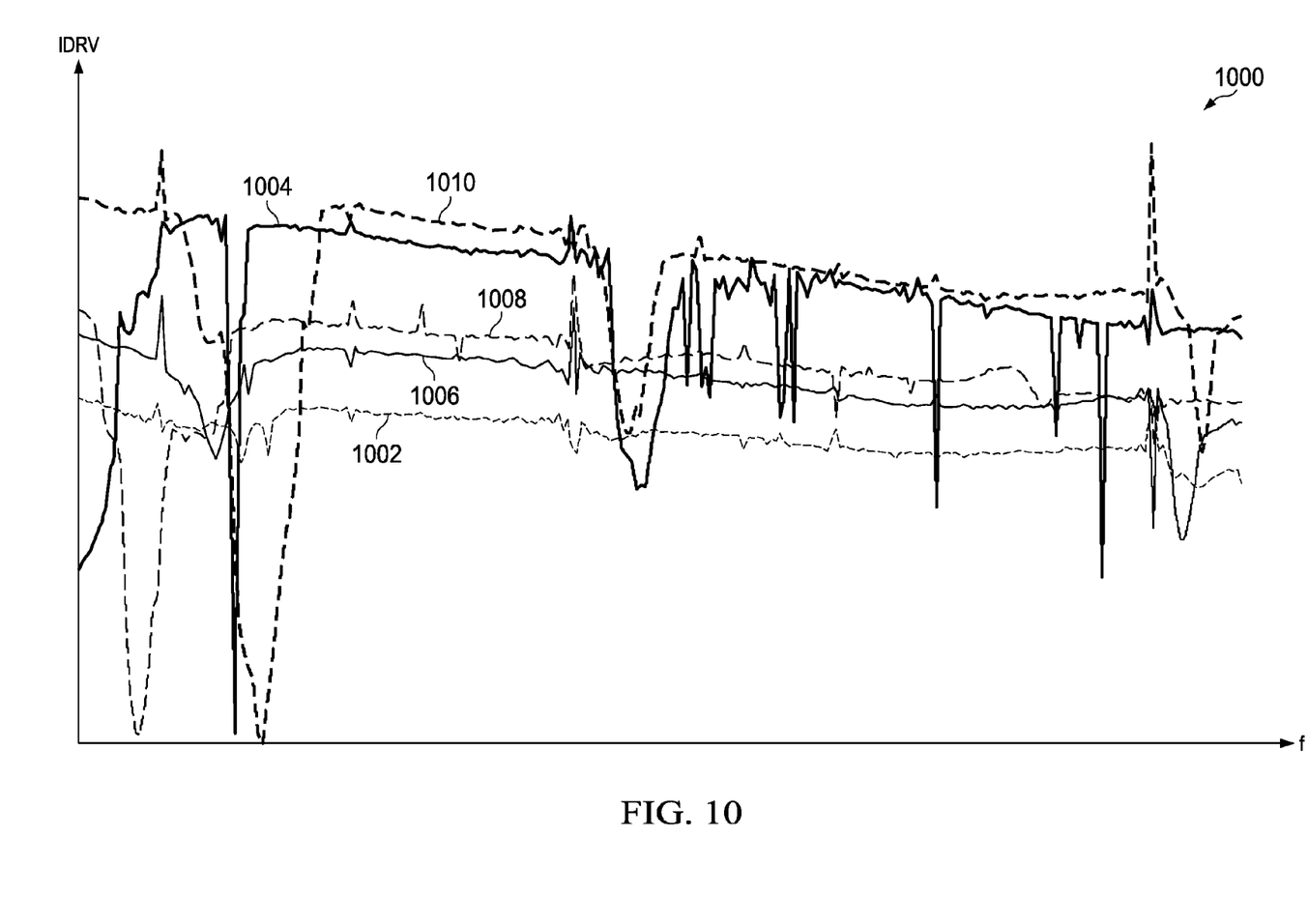
FIG. 10 is a graph of current as a function of frequency showing profiles for different lens contaminants.

In another example, the comparison of the sweep profile with the contaminant profile or profiles 128 at 607 is omitted, in which case the control circuit 130 identifies resonance and/or anti-resonance frequencies at 608 corresponding to peaks and valleys of the drive current data from the frequency sweep at 604. In this example, the control circuit identifies one or more frequencies corresponding to local maxima or local minima of the plurality of current signal values at 608, and generates the drive signal VDRV at one or more of the identified frequencies to promote cleaning of the lens 202. At 610, the control circuit 130 provides the frequency command signal Ft to the signal generator circuit 116 in order to cause the driver 100 to provide the oscillating drive signal VDRV at 610 to clean the lens 202. Any suitable comparison techniques can be used at 606 and 607 to determine whether the frequency sweep current sample data is sufficiently similar to the clean lens profile 128 and/or to one or more predetermined contaminant profiles 128. For example, as seen in FIGS. 9 and 10 below, a clean lens profile 128 and a contaminated or dirty lens profile 128 typically include one or more resonance or anti-resonance frequencies corresponding to peaks and/or valleys of the corresponding current sample waveform profile. In one example, the control circuit 130 compares the peaks and/or valleys of the two compared data sets, such as through mathematical subtraction, and determines similarity or dissimilarity based on the amount of deviation between the current (or computed impedance) values at a given predetermined or suspected resonance or anti-resonance frequency. In addition, the driver 100 generates the drive signal VDRV at 610 at a single frequency or at two or more frequencies concurrently. In this manner, the lens 202 can be mechanically oscillated or vibrated at multiple frequencies to concurrently address multiple forms or types of contaminants, such as water droplets, ice, dirt, etc.

In certain examples, the driver 100 continues cleaning at 610 in closed fashion for a predetermined time before the processing 600 returns to again perform a frequency sweep at 604 as previously described. In one example, the predetermined time spent cleaning at 610 can be different for different matched cleaning profiles. For example, the driver 100 may spend more time at 610 cleaning a first type of contaminant than is spent cleaning a different second type of contaminant. In other possible examples, the driver 100 continues the cleaning at 610 until a camera or other optical system (e.g., camera 212 in FIG. 2 above) signals the driver 100 that the lens 202 is sufficiently clean to finish the operation at 610. Once the cleaning is terminated at 610, in one example, the process 600 returns to 604 and a further frequency sweep is performed. If the cleaning is sufficient, the driver 100 determines that the subsequent sweep data is sufficiently similar to the clean lens profile (YES at 606), and the cleaning cycle is done at 612. If further cleaning is to be done (NO at 606), the processing at 607-610 is repeated as previously described. In one example, the driver 100 performs an initial sweep at 604 and may determine at 607 that two or more profile comparisons indicate suspected presence of two or more corresponding contaminants, in which case the driver 100 performs the cleaning at 610 initially to clean a first contaminant, and in a second iteration, performs a further cleaning at 610 to remove a second contaminant, and the process 600 can iterate in this fashion until the most recent drive current frequency sweep data at 606 is determined to be sufficiently similar to the clean lens profile (YES at 606).

In certain examples, the control circuit 130 performs frequency locking in controlling the signal generator 116 for generation of the drive signal VDRV to lock onto at least one resonance frequency according to the sensed drive current IDRV. For example, the control circuit 130 in one example makes slight adjustments to the drive frequency at 610, detects the amplitude of the sensed drive current IDRV and monitors this for increasing or decreasing amplitude changes based on the frequency adjustment. In addition, the control circuit 130 preferentially adjusts the frequency until a local minima or local maxima is reached in the current amplitude in order to perform resonance tracking or locking.

Figure 7:
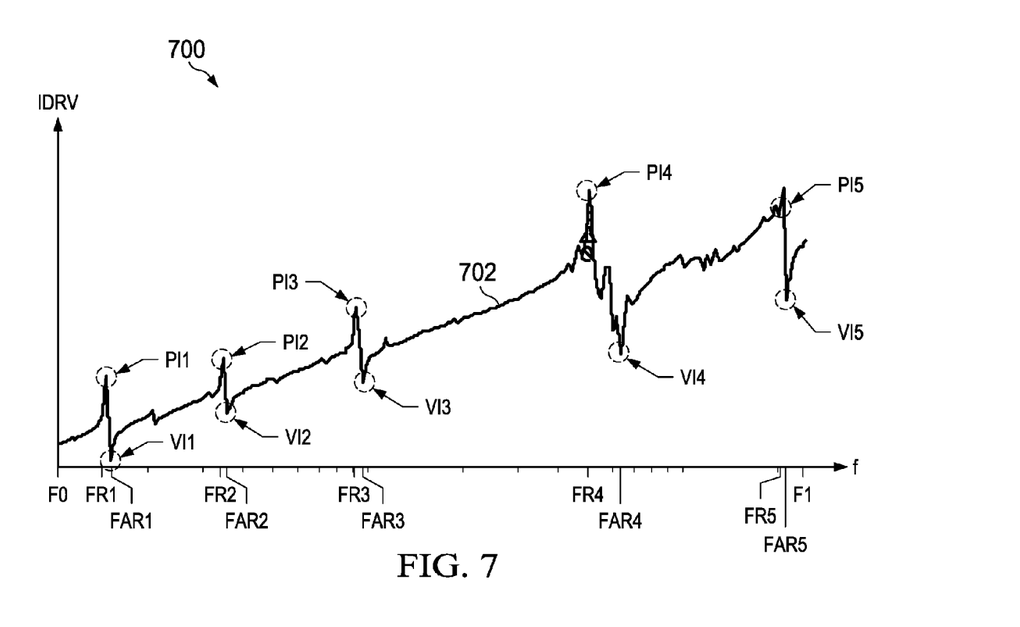
FIG. 7 is a graph of drive current as a function of frequency in the camera lens assembly of FIG. 2.
Figure 8:
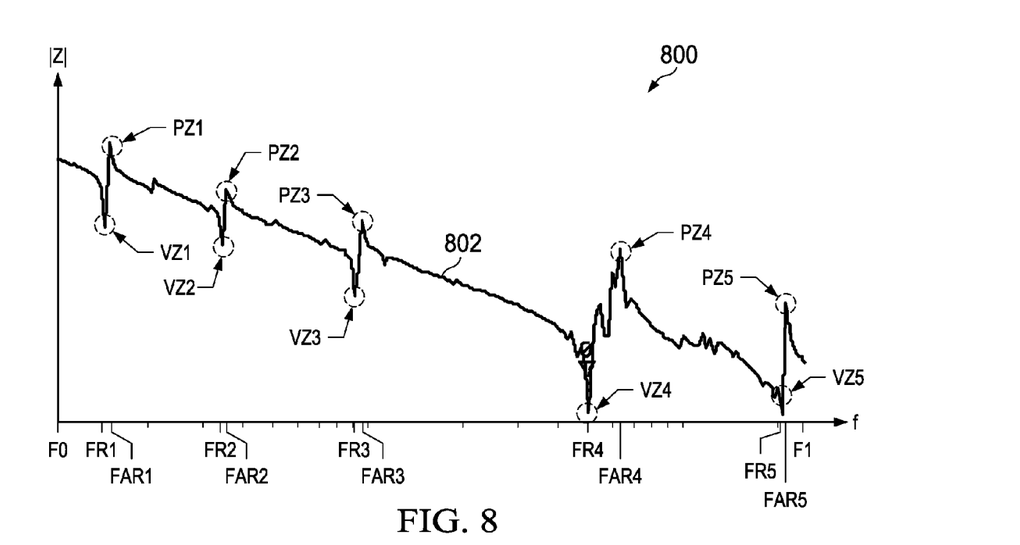
FIG. 8 is a graph of lens assembly impedance as a function of frequency in the camera lens assembly of FIG. 2.

Referring also to FIGS. 7 and 8, the control circuit 130 can use any suitable technique or criterion at 607 and 608 to identify or select the frequency or frequencies at which the oscillator 102 will be driven in order to facilitate lens cleaning. In addition, the driver IC 100 controls the frequency of the drive signal VDRV during the cleaning at 610 according to the current sense signal IS in a closed loop fashion. FIG. 7 shows a graph 700 with a curve 702 of transducer drive current IDRV as a function of frequency in an example sweep or scan of isolation frequencies between a first frequency F0 and a second frequency F1 and FIG. 8 shows a graph 800 with a curve 802 representing the transducer impedance as a function of frequency over the same frequency range. In these examples, the sweep circuit 122 causes the signal generator 116 to individually generate the first output signals VS at a plurality of command frequencies Ft in the range F0-F1, and the control circuit 130 obtains a corresponding plurality of current signal values of the current sense signal IS individually corresponding to the plurality of command frequencies Ft. From this, the control circuit 130 in one example constructs a profile represented by the current curve 702 in FIG. 7. In this example, the curve 702 includes a number of current peaks or local maxima PI1, PI2, PI3, PI4 and PI5 corresponding to resonant frequencies FR1, FR2, FR3, FR4 and FR5, as well as anti-resonant valleys or local minima VI1, VI2, VI3, VI4 and VI5 at corresponding anti-resonant frequencies FAR1, FAR2, FAR3, FAR4 and FAR5. The impedance curve 802 in FIG. 8 has impedance valleys or local minima VZ1, VZ2, VZ3, VZ4 and VZ5 corresponding to the peaks PI1-PI5 in the current curve 702 at the resonant frequencies FR1, FR2, FR3, FR4 and FR5, as well as impedance peaks or local maxima PZ1, PZ2, PZ3, PZ4 and PZ5 corresponding to the valleys VI1-VI5 in the current curve 702 at the anti-resonant frequencies FAR1, FAR2, FAR3, FAR4 and FAR5.

FIG. 9 Illustrates drive current curves 902, 904 and 906 representing the drive current IDRV flowing in the transducer 102 as a function of frequency. The curve 902 represents a clean lens current profile where no water or contaminants are on the lens 202. The curve 904 represents the frequency profile of the lens 202 with a large amount of water contaminant, and the curve 906 is a profile of the lens 202 having two drops of water thereon. As seen in the graph 900, the large amount of water contaminant for the curve 904 results in an anti-resonant valley or local minima indicated at 914 which is not seen in the other curves 902 or 906. Similarly, the curve 906 representing two drops of water on the lens 202 has a local minima indicated at 916 which is not found in the other two profile curves 902 or 904. At the same time, however, each of the three profiles 902, 904 and 906 has a local maxima or peak indicated at 910 and a local minima or valley indicated at 912. The control circuit 130 in one example stores profile curves or data 128, such as the curves 902, 904 and 906 shown in FIG. 9, and compares frequency sweep data with the previously stored profiles 128 to determine if a known contaminant is present or suspected on the lens 202, and can proactively target the cleaning frequency or frequencies based on the predetermined profiles 128 depending on the similarity or dissimilarity identified in the comparison.

FIG. 10 provides a graph 1000 showing another example with current curves 1002, 1004, 1006, 1008 and 1010 as a function of frequency representing profiles 128 for different lens contaminants. In this example, the curve 1002 corresponds to a baseline profile for a clean lens 202, the curve 1004 corresponds to a lens 202 with two drops of water thereon, the curve 1006 corresponds to a lens 202 with a mist contaminant thereon, the curve 1008 corresponds to a lens 202 with mud contaminant thereon, and the curve 1010 corresponds to dirt contaminant on the lens 202. As seen in FIG. 10, different profile curves 1004-1010 can be used by the control circuit 130 in order to differentiate between a dirty lens 202 and a clean lens (e.g., comparing frequency sweep data against the clean lens profile curve 1002), and then to perhaps identify a particular contaminant type based on similarity of the sweep data to a predetermined contaminant curve 1004, 1006, 1008 or 1010 in this example. Once the control circuit 130 identifies a suspected contaminant is present on the lens 202 based on this comparison, the control circuit 130 in one example selects one or more local maxima or local minima from the corresponding contaminant profile curve 128 (or from the frequency sweep data just obtained), and operates the signal generator 116 in order to target specific frequencies to promote cleaning of the lens 202. drawings. Modifications are possible in the described embodiments, and other embodiments are possible, within the scope of the claims.

The following is claimed:

1. An ultrasonic cleaning system, comprising:
a signal generator having a signal generator input and a signal generator output, the signal generator is configured to generate an output signal at the signal generator output, the output signal oscillating at a non-zero frequency according to a control signal at the signal generator input;
an amplifier having an amplifier input and an amplifier output, the amplifier input coupled to the signal generator output, the amplifier output adapted to be coupled to a transducer, the transducer adapted to be mechanically coupled to a lens and configured to vibrate the lens according to a drive signal, and the amplifier configured to generate the drive signal at the amplifier output by amplifying the output signal;
a current sense circuit having a current sense input and a current sense output, the current sense input adapted to be coupled to the transducer, and the current sense circuit configured to sense a drive current flowing in the transducer and to generate a current sense signal at the current sense output, the current sense signal representing the drive current; and
a control circuit having a control input and a control output, the control input coupled to the current sense output, the control output coupled to the signal generator input, and the control circuit configured to generate the control signal at the control output according to the current sense signal.

2. The system of claim 1, wherein the amplifier has an amplifier control input, and the system further comprises a protection circuit having a protection circuit input and a protection circuit output, the protection circuit input coupled to the current sense output, the protection circuit output coupled to the amplifier control input, the protection circuit configured to generate a protection signal at the protection circuit output according to the current sense signal, and the amplifier configured to selectively adjust a gain of the amplifier according to the protection signal.

3. The system of claim 1, wherein the control circuit is configured to: generate the control signal in a manner that causes the output signal to oscillate at a plurality of frequencies in a frequency range; and obtain a plurality of current signal values of the current sense signal respectively corresponding to the plurality of frequencies.

4. The system of claim 3, wherein the control circuit is configured to:
compare a first profile corresponding to a clean lens to a second profile corresponding to the plurality of current signal values and the corresponding plurality of frequencies; and
if the first and second profiles are dissimilar;
identify one or more frequencies corresponding to local maxima or local minima of the plurality of current signal values; and
generate the control signal in a manner that causes the output signal to oscillate at one or more identified frequencies to promote cleaning of the lens.

5. The system of claim 4, wherein the control circuit is configured to, after the control circuit generates the control signal in a manner that causes the output signal to oscillate at one or more identified frequencies to promote cleaning of the lens:
again generate the control signal in a manner that causes the output signal to oscillate at the plurality of frequencies in the frequency range;
obtain a further plurality of current signal values of the current sense signal respectively corresponding to the plurality of frequencies;
compare the first profile to a further profile corresponding to the further plurality of current signal values and the corresponding plurality of frequencies to determine whether further cleaning is needed; and
if the first and further profiles are dissimilar:
identify one or more further frequencies corresponding to local maxima or local minima of the further plurality of current signal values; and
generate the control signal in a manner that causes the output signal to oscillate at one or more of the identified further frequencies to promote cleaning of the lens.

6. The system of claim 3, wherein the control circuit is configured to: compare a predetermined profile corresponding to a lens with a known contaminant and a second profile corresponding to the plurality of current signal values and the corresponding plurality of frequencies; and if the second profile is similar to the predetermined profile, generate the control signal in a manner that causes the output signal to oscillate at one or more predetermined frequencies to promote removal of the known contaminant from the lens.

7. The system of claim 3, wherein the control circuit is configured to: store a plurality of predetermined profiles respectively corresponding to a lens with a corresponding known contaminant; compare the second profile and the plurality of predetermined profiles; and if the second profile is similar to a given set of the predetermined profiles, generate the control signal in a manner that causes the output signal to oscillate at one or more predetermined frequencies corresponding to each of the given set of the predetermined profiles to promote removal of the corresponding known contaminants from the lens.

8. The system of claim 7, wherein the control circuit is configured to generate the control signal in a manner that causes the output signal to oscillate at two or more of the predetermined frequencies concurrently.

9. The system of claim 3, wherein the control circuit is configured to generate the control signal in a manner that causes the non-zero frequency of the output signal to lock onto at least one resonance frequency according to the current sense signal.

10. The system of claim 1, wherein the control circuit is configured to generate the control signal in a manner that causes the non-zero frequency of the output signal to lock onto at least one resonance frequency according to the current sense signal.

11. An integrated circuit (IC), comprising:
a signal generator having a signal generator input and a signal generator output, the signal generator configured to generate an output signal at signal generator output, the output signal oscillating at a non-zero frequency according to a control signal at the signal generator input;
an amplifier having an amplifier input and an amplifier output and an amplifier control input, the amplifier input coupled to the signal generator output, the amplifier output adapted to be coupled to an ultrasonic transducer, the transducer adapted to be mechanically coupled to a lens and configured to vibrate the lens according to an oscillating drive signal, and the amplifier configured to generate the oscillating drive signal at the amplifier output by amplifying the output signal;
a current sense circuit having a current sense input and a current sense output, the current sense input adapted to be coupled to the transducer, and the current sense circuit configured to sense a drive current flowing in the transducer and to generate a current sense signal at the current sense output, the current sense signal representing the drive current;
a control circuit having a control input and a control output, the control input coupled to the current sense output, the control output coupled to the signal generator input, and the control circuit configured to generate the control signal at the control output according to the current sense signal; and
a protection circuit having a protection circuit input and a protection circuit output, the protection circuit input coupled to the current sense output, the protection circuit output coupled to the amplifier control input, the protection circuit configured to generate a protection signal at the protection circuit output according to the current sense signal, and the amplifier configured to selectively adjust a gain of the amplifier according to the protection signal.

12. The IC of claim 11, wherein the control circuit is configured to generate the control signal in a manner that causes the non-zero frequency of the output signal to lock onto at least one resonance frequency according to the current sense signal.

13. An integrated circuit (IC), comprising:
a signal generator having a signal generator input and a signal generator output, the signal generator configured to generate an output signal at the signal generator output, the output signal oscillating at a non-zero frequency according to a control signal at the signal generator input;
an amplifier having an amplifier input and an amplifier output and an amplifier control input, the amplifier input coupled to the signal generator output, the amplifier output adapted to be coupled to an ultrasonic transducer, the transducer adapted to be mechanically coupled to a lens and configured to vibrate the lens according to an oscillating drive signal, and the amplifier configured to generate the oscillating drive signal at the amplifier output by amplifying the output signal;
a current sense circuit having a current sense input and a current sense output, the current sense input adapted to be coupled to the transducer, and the current sense circuit configured to sense a drive current flowing in the transducer and to generate a current sense signal at the current sense output, the current sense signal representing the drive current; and
a control circuit having a control input and a control output, the control input coupled to the current sense output, the control output coupled to the signal generator input, and the control circuit configured to: generate the control signal at the control output according to the current sense signal; generate the control signal in a manner that causes the output signal to oscillate at a plurality of frequencies in a frequency range; and obtain a plurality of current signal values of the current sense signal respectively corresponding to the plurality of frequencies.

14. The IC of claim 13, wherein the control circuit is configured to:
compare a first profile corresponding to a clean lens to a second profile corresponding to the plurality of current signal values and the corresponding plurality of frequencies; and
if the first and second profiles are dissimilar;
identify one or more frequencies corresponding to local maxima or local minima of the plurality of current signal values; and
generate the control signal in a manner that causes the output signal to oscillate at one or more identified frequencies to promote cleaning of the lens.

15. The IC of claim 13, wherein the control circuit is configured to: compare a predetermined profile corresponding to a lens with a known contaminant and a second profile corresponding to the plurality of current signal values and the corresponding plurality of frequencies; and if the second profile is similar to the predetermined profile, generate the control signal in a manner that causes the output signal to oscillate at one or more predetermined frequencies to promote removal of the known contaminant from the lens.

16. The IC of claim 13, wherein the control circuit is configured to generate the control signal in a manner that causes the non-zero frequency of the output signal to lock onto at least one resonance frequency according to the current sense signal.

* * * * *